United States Patent Office 3,270,092
Patented August 30, 1966

3,270,092
CYCLIC PHOSPHONITES
Harold James Harwood, Cuyahoga Falls, Ohio, assignor to Monsanto Company, a corporation of Delaware
No Drawing. Filed Nov. 7, 1960, Ser. No. 67,505
7 Claims. (Cl. 260—937)

This invention relates to the preparation of organic phosphorus compounds. More particularly this invention is directed to the preparation of new cyclic phosphonite esters.

It is an object of this invention to provide new cyclic phosphonite esters. It is a further object of this invention to provide a method for preparing cyclic phosphonite esters. Other objects will become apparent from a reading of the accompanying description and claims.

In general, this invention is directed to the preparation of cyclic phosphonite esters having the structural formula

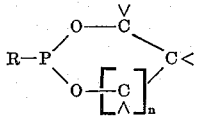

wherein R is a hydrocarbyl radical free from non-benzenoid unsaturation and containing from 1 to 8 carbon atoms, each of the indicated free valences of the carbon atoms in the ring being satisfied by a radical free from non-benzenoid unsaturation containing hydrogen, less than 7 carbon atoms, and less than 2 oxygen atoms, and $n$ is a whole number of from 0 to 1.

The compounds described above are prepared, according to the method of this invention, by reacting a phosphonous dihalide of the formula $$RPX_2$$

wherein R is as defined above, and X is selected from the group consisting of chlorine, bromine, and iodine, but is preferably chlorine or bromine, with a saturated aliphatic dihydric alcohol of the formula

wherein $n$ is as defined above, and the indicated free valences of the carbon atoms are satisfied as defined above; according to the following general reaction;

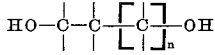

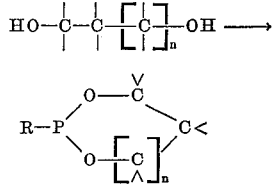

wherein R, and $n$ are as defined above, and the indicated free valences of the carbon atoms are satisfied as described above.

For example, the phosphonous dihalide reactant may be a straight, cyclic, or branched chain alkylphosphonous dihalide, preferably the dichloride or dibromide, having from 1 to 8 carbon atoms in the alkyl group. Examples of such compounds are: methyl-, ethyl-, isopropyl-, butyl-, 2-ethylhexyl-, octyl-, cyclopentyl-, or cyclohexylphosphonous dichlorides, dibromides, and diiodides. Aryl- and alkarylphosphonous dihalides having a total of from 6 to 8 carbon atoms in the aryl or alkaryl radical may also be used. Examples of such compounds are: phenyl-, p-tolyl-, 1-(2,4-xylyl)-, and 4-ethylphenylphosphonous dichloride, dibromide or diiodide. Mixtures of such compounds can also be used.

Among the saturated aliphatic dihydric alcohols useful as starting materials in the process of this invention are the following: ethylene glycol, 1,3-propanediol, 2-methyl-2-ethyl-1,3-propanediol, 2,2-dimethyl-1,3-propanediol, 1,1,3-trimethyl-1,3-propanediol, 2,3-butanediol, 4,5-pentanediol, 2-ethyl-1,3-hexanediol, 1,3-butanediol, 2-methyl-1,3-butanediol, 2,4-dimethyl-2,4-pentanediol, 2,3,3,4-tetramethyl-2,4-pentanediol, 2-butyl-1,3-propanediol, 2-cyclohexyl-1,3-butanediol, 1,3-hexanediol, 2-isopropyl-5-methyl-1,3-hexanediol, 2,4-hexanediol, 3,4-hexanediol-4,4,5-tetraethyl-3,5-heptanediol, 5,6-octanediol, 2,5-hexanediol, 4,7-octanediol, 2-phenyl-1,3-propanediol, 3-(p-tolyl)-2,4-butanediol, etc.

Saturated aliphatic dihydric alcohols having ether substituents in the alkylene chain on carbon atoms other than the carbinol carbon atoms may also be used, examples of which are: 1,2-bis(3-methoxypropyl)ethanediol, 2-methoxy-1,3-propanediol, 2-methoxy-1,3-butanediol, 5-ethoxy-2,3-hexanediol, 2-phenoxy-2,4-pentanediol, etc.

The reaction between the phosphonous dihalide compounds and the diol compound is preferably conducted at temperatures of from about 0° C. to about 40° C. However, temperatures on the order of from —50° to 100° C. can be used, and the reaction can be conducted at reduced, ordinary or increased pressure.

The reaction between the phosphonous dihalide reactant and the diol compound should be conducted in the presence of a hydrogen halide scavenger or acid acceptor substance, such as a tertiary amine, e.g., pyridine, N,N-dimethylaniline, trimethylamine, tributylamine, etc. By conducting the reaction in the presence of these acid acceptor materials, the by-product hydrogen halide forms a salt or complex and is removed from the reaction medium generally as a precipitate. However, any substantially anhydrous inert solvent can be employed such as benzene, toluene, the o-, m-, and p-xylenes, ethylene dichloride, hexane, heptane, dioxane, and the like, so long as a stoichiometric amount of acceptor substance is present.

The process of this invention involves the reaction of equimolar quantities of the phosphonous dihalide reactant and the diol compound. However, an excess of either reactant can be used. For example, molar ratios of the phosphonous dihalide to the diol reactant of from between 0.25 to 1 and 1.25 to 1 can be used. A slight excess of the diol reactant and acid acceptor material is preferred since this prevents possible formation of free HCl in the system due to decomposition of any unreacted phosphonous dihalide reactant.

In most instances the reaction is mildly exothermic initially. Whether the reaction goes to completion without the reactants. Completion of the reaction in any event, the use of extraneous heat is determined by the nature of can be readily ascertained by noting cessation in change of viscosity, refractive index, or by the quantity of by-product, hydrogen halide which is evolved. After separating the hydrogen halide by-product, and the solvent, if used, the product may be further purified by solvent extraction procedures under anhydrous conditions.

Examples of products of this invention are:

2-methyl-1,3,2-dioxaphospholane;
2-phenyl-1,3,2-dioxaphosphorinane;
2-butyl-5,5-diethyl-1,3,2-dioxaphosphorinane;
2-(p-tolyl)-4,4,5-trimethyl-1,3,2-dioxaphospholane;
2-hexyl-5-phenyl-1,3,2-dioxaphosphorinane;
2-cyclopentyl-4,5-dimethyl-1,3,2-dioxophospholane;
2-phenyl-4,5-dimethyl-1,3,2-dioxaphospholane;
2-cyclohexyl-1,3,2-dioxaphosphorinane;
2-(p-tolyl)-5-ethyl-5-methyl-1,3,2-dioxaphospholane;
2-(o-xylyl)-4,5,6-trimethyl-1,3,2-dioxaphospholane; and
2-phenyl-4,4,5,5-tetramethyl-1,3,2-dioxaphospholane; and
2-phenyl-4,6-diphenyl-1,3,2-dioxaphosphorinane.

Examples of cyclic phosphonite esters of the above defined types having ether substituents in the alkylene chain are:

2-propyl-4-(4-methoxybutyl)-5-methyl-1,3,2-dioxaphospholane,
2-phenyl-5-ethoxy-1,3,2-dioxaphosphorinane,
2-cyclohexyl-5-phenoxy-1,3,2-dioxaphosphorinane, and
2-(p-tolyl)-5-methoxy-1,3,2-dioxaphosphorinane.

The invention is further illustrated but not limited by the following examples:

*Example 1*

Solutions of ethylene glycol (31 g.) in 100 ml. of pyridine and phenylphosphonous dichloride (68 g.) in 200 ml. of benzene were slowly added to a solution of 20 ml. of pyridine in benzene at 10–20% C. over a period of one-half hour and the mixture was then stirred for one-half hour longer. Precipitated pyridine hydrochloride was removed by filtration and washed with fresh benzene. The filtrates were concentrated on a water bath and the residue distilled. The viscous product (B.P. 80.5 to 82.0/1.8 mm.; $n_D^{25}$ 1.5849–1.5919) weighed 24 g., and was 2-phenyl-1,3,2-dioxaphospholane.

*Example 2*

Solutions of neopentyl glycol (529 g.) in 100 ml. of dry pyridine and phenylphosphonous dichloride (68 g.) in 100 ml. of benzene were slowly added simultaneously to a stirred solution of 20 ml. pyridine in 200 ml. of benzene at 0–20° C. over a period of 1.5 hours and the mixture stirred for an additional hour. The precipitated pyridine hydrochloride was removed by filtration and washed with fresh benzene. The combined filtrates were concentrated under vacuum on a water bath to a light yellow viscous oil. Distillation yielded 70 g. (67% of theory) of 2-phenyl-5,5-dimethyl-1,3,2-dioxaphosphorinane, B.P. 100° C./1.5 mm., M.P. 82–83° C.

*Example 3*

Solutions of 38 g. of 1,3-propanediol in 100 ml. of pyridine and 68 ml. of phenyldichlorophosphine in 100 ml. of benzene were added slowly to 200 ml. of benzene containing 20 ml. of pyridine over a period of 1.5 hours. The reaction mixture was cooled and stirred in an ice bath during this time. Stirring was continued for 1 hour longer. Precipitated pyridine hydrochloride was filtered, washed with benzene and discarded. The filtrates were concentrated under vacuum to a thick yellow syrup and distilled under reduced pressure to obtain 35 g. of 2-phenyl-1,3,2-dioxaphosphorinane, B.P. 137° C./0.45 mm., $n_D^{25}$ 1.5510–1.5502.

*Example 4*

The procedure of Example 1 is repeated except that ethylphosphonous dibromide is used as the phosphonous dihalide reactant. After removing the precipitated hydrobromide salt there is obtained as product, 2-ethyl-1,3,2-dioxaphospholane.

The present cyclic phosphonite esters are well defined compounds which range from viscous liquids to waxy or crystalline solids. They may be employed advantageously for a variety of industrial purposes. They are useful as plasticizers, and as fire-retardant additives for various polymer systems. The materials are especially useful in that they provide a good route for making very stable bis(phosphinic acid) compounds by heating them in the presence of a catalyst, such as aluminum chloride or methyl iodide, to form a low molecular weight polymer and then hydrolyzing the polymer to the acid product.

*Example 5*

This example illustrates how the cyclic phosphonite esters of this invention may be used to prepare bis(phosphinic acid) compounds.

A few drops of methyl iodide was mixed with 13.6 g. of 2-phenyl-1,3,2-dioxaphospholane and the mixture was heated in a nitrogen atmosphere at 150° C. for 1.5 hours, causing a vigorous reaction to take place. The dark brown and very viscous mixture was treated with 2 drops of 1,6-dibromohexane and the heating was continued at 150° C. for 3 hours. The product was a hard resin-like substance which slowly crystallized on standing. A solid acid, 4.3 g., M.P. 220–240° C., was isolated from the mixture by dissolving the material in acetone and alcohol. Additional material, 3.3 g., M.P. 220–237° C. was obtained by refluxing the acetone and alcohol extracts with dilute NaOH for several hours and acidifying. The total yield of this acid was 7.6 g. (61% of theory). It was shown by infrared analysis to be ethylene-1,2-bis(phenylphosphinic acid). The acid was purified by recrystallization from acetic acid yielding glistening plates, M.P. 266–267.5.

I claim:
1. Compounds of the formula

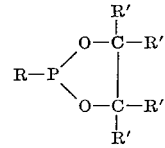

wherein R is aryl having from 6 to 8 carbon atoms, and each R' is selected from the group consisting of hydrogen and alkyl having from 1 to 6 carbon atoms.

2. A compound of the formula

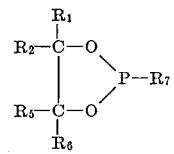

wherein $R_1$, $R_2$, $R_5$, and $R_6$ are each a member of the group consisting of hydrogen and lower alkyl and $R_7$ is a member of the group consisting of phenyl and tolyl.

3. 2-phenyl-1,3,2-dioxaphospholane.
4. The method which comprises reacting a compound of the formula

wherein R is a hydrocarbyl radical free form non-benzenoid unsaturation and containing from 1 to 8 carbon atoms, and X is selected from the group consisting of bromine, chlorine, and iodine, with a saturated aliphatic dihydric alcohol having the formula

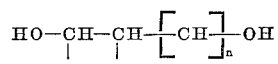

wherein each of the indicated free valences of the carbon atoms is satisfied by a radical free from non-benzenoid unsaturation containing only hydrogen, less than 7 carbon atoms, and less than 2 oxygen atoms, and $n$ is a whole number of from 0 to 1, and recovering from the resulting reaction mixture, a compound having the formula

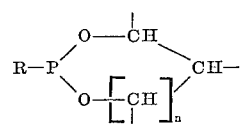

wherein R and $n$ are as defined above, and the indicated free valences of the carbon atoms are satisfied as described above.

5. The method which comprises reacting a compound of the formula

wherein R is selected from the group consisting of alkyl, aryl, and alkaryl radicals having up to 8 carbon atoms, and X is selected from the group consisting of bromine, chlorine, and iodine with a saturated aliphatic dihydric alcohol having the formula

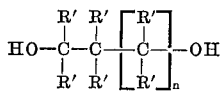

wherein each R' radical is selected from the group consisting of hydrogen, and alkyl radicals having from 1 to 6 carbon atoms, and $n$ is a whole number of from 0 to 1 at a temperature of from −50° C. to 100° C., in the presence of an acid acceptor substance.

6. The process which comprises reacting phenylphosphonous dichloride with ethylene glycol at a temperature of from 50° C. to 100° C. in the presence of an acid acceptor substance, and recovering from the resulting reaction mixture 2-phenyl-1,3,2-dioxaphospholane.

7. The process which comprises reacting phenylphosphonous dichloride with 2,2-dimethyl-1,3-propanediol at a temperature of from −50° C. to 100° C. in the presence of an acid acceptor substance, and recovering from the resulting reaction mixture 2-phenyl-5,5-dimethyl-1,3,2-dioxaphosphorinane.

References Cited by the Examiner
UNITED STATES PATENTS

| 2,234,379 | 3/1941 | Martin | 260—461.304 |
| 2,899,455 | 8/1959 | Coover et al. | 260—461.304 |
| 3,031,489 | 4/1962 | Birum et al. | 260—461.304 |
| 3,055,861 | 9/1962 | Hersh et al. | 260—461.304 |

OTHER REFERENCES

Korshak et al.: Bull. Acad. Sci. U.S.S.R., Div. of Chem. Sci., No. 5, pages 641–646 (May 1957) (English translation).

CHARLES B. PARKER, *Primary Examiner.*

MORRIS LIEBMAN, IRVING MARCUS, *Examiners.*

D. D. HORWITZ, F. M. SIKORA, F. D. HIGEL, R. L. RAYMOND, *Assistant Examiners.*